UNITED STATES PATENT OFFICE.

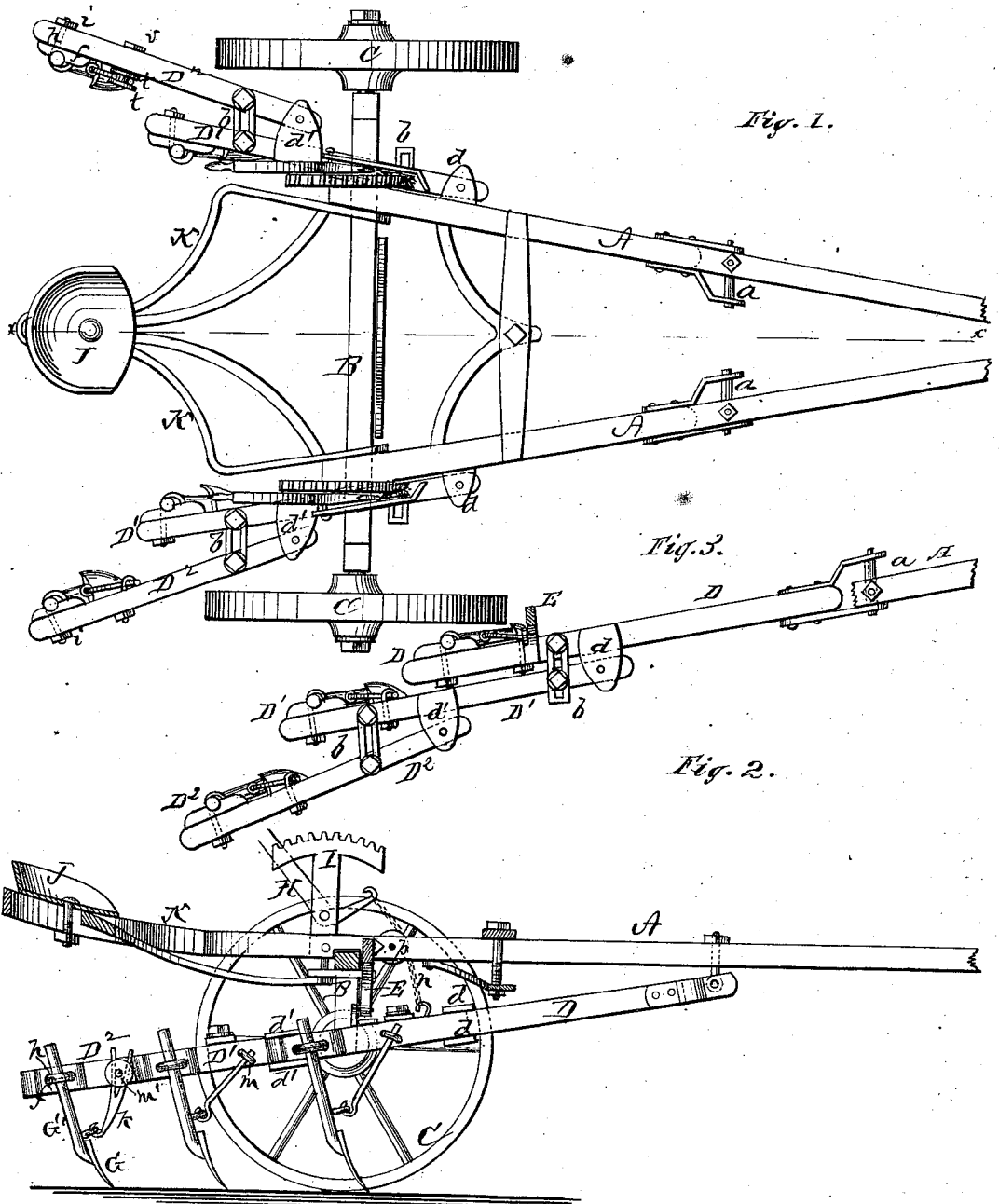

JOHN N. BASHAW, OF GENEVA LAKE, WISCONSIN.

IMPROVEMENT IN CULTIVATORS.

Specification forming part of Letters Patent No. 161,855, dated April 13, 1875; application filed March 1, 1875.

*To all whom it may concern:*

Be it known that I, JOHN N. BASHAW, of Geneva Lake, in the county of Walworth and State of Wisconsin, have invented certain new and useful Improvements in Cultivators; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The nature of my invention consists in the construction and arrangement of a cultivator, as will be hereinafter more fully set forth.

In the annexed drawing, Figure 1 is a plan view of my cultivator; and Fig. 2 is a longitudinal vertical section of the same through the line $x\,x$ of Fig. 1. Fig. 3 is a top detached view of one of the main beams, with supplemental beams attached.

A represents an ordinary split or V-shaped tongue, secured to the axle-tree B, the ends of which are bent at right angles downward, and then outward, forming the spindles to receive the wheels C C. To each arm of the tongue is hinged a beam, D, by means of a T-joint, $a$, as shown. Each beam D is, at a suitable point, provided with top and bottom plates $d\,d$, which project on the outer side thereof, and between said plates is pivoted the front end of another beam, $D^1$. This beam is in like manner provided with plates $d'\,d'$, between which the front end of a beam, $D^2$, is pivoted. The beams D $D^1$ and the beams $D^1\,D^2$ are connected together by means of slotted links $b\,b$, so that the beams may be closed together or opened, more or less, so as to cut wide or close as desired. The two beams D D are connected together by means of an arched brace, E, hinged to the two beams, and said beams being hinged to the tongue by separate joints, either one may play up or down independent of the other. To the rear end of each of the six beams, on the inner side, is attached a shovel-plow, G, in the following manner. The plow is provided with a round shank, $G'$, which passes up through a staple, $h$. One arm of this staple passes through a block, $f$, and through the beam, and is fastened by a nut, $i$. The other end of the staple rests in a recess in the block, which is made concave, between the two arms of the staple, to receive the shank $G^1$. By tightening the nut $i$ the shank will be held against the block, and the block against the beam, sufficiently firm for all practical purposes. To the front of the shank $G'$ is hinged a rod, $k$, which passes through a similar staple or hook, $m$, passed through the beam and fastened by a nut. In case of the plow meeting any obstructions, the fastenings will give, and allow the plow to turn, obviating the trouble of using wooden pins, as is now usually the case. Each beam $D^1$ is, by a chain, $n$, passing over a pulley, $p$, connected to an elbow-lever, H, pivoted to the outer side of the tongue at the rear end, and held by a rack, I. By this means each set of beams may be raised and lowered independent of the other. J is the driver's seat, connected to the tongue by bars $k\,k$, and braced from the axle, as shown. Instead of the rod $k$ passing through the hook $m$, as above described, I prefer, on account of better security in fastening, to split the upper end of the rod and hold it between two washers, $t\,t$, on a bolt, $m'$, said bolt being tightened by a nut, $v$.

Having thus fully described my invention, what I claim as new, and desire to secure by Letters Patent, is—

1. In a cultivator, the combination of the beams D, $D^1$, and $D^2$, hinged as described, whereby the beams $D^1$ and $D^2$ may be adjusted in relation to each other, and in relation to the beam D, all constructed as and for the purpose set forth.

2. The split tongue A, hinged beams D D, each having adjustable beams $D^1\,D^2$, in combination with the flexible brace E, chains $n\,n$, elbow-levers H, and T-joint $a$, all as and for the purpose set forth.

In testimony that I claim the foregoing as my own, I affix my signature in presence of two witnesses.

JOHN N. BASHAW.

Witnesses:
JOHN A. SMITH,
ALBERT E. OVIATT.